United States Patent
Chu et al.

(10) Patent No.: US 10,988,107 B2
(45) Date of Patent: Apr. 27, 2021

(54) APPARATUS FOR DETECTING VEHICLE BUCKLE AND VEHICLE SYSTEM INCLUDING SAME

(71) Applicants: HYUNDAI MOTOR COMPANY, Seoul (KR); KIA MOTORS CORPORATION, Seoul (KR)

(72) Inventors: Sang Uk Chu, Gyeonggi-do (KR); Ga Ram Hwang, Siheung-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 68 days.

(21) Appl. No.: 16/393,480

(22) Filed: Apr. 24, 2019

(65) Prior Publication Data

US 2020/0156590 A1    May 21, 2020

(30) Foreign Application Priority Data

Nov. 16, 2018  (KR) .................. 10-2018-0142006

(51) Int. Cl.
| | |
|---|---|
| *B60Q 1/00* | (2006.01) |
| *B60R 22/48* | (2006.01) |
| *B60R 21/015* | (2006.01) |
| *B60R 22/357* | (2006.01) |
| *B60W 50/02* | (2012.01) |
| *B60W 50/00* | (2006.01) |

(52) U.S. Cl.
CPC ........ *B60R 22/48* (2013.01); *B60R 21/01532* (2014.10); *B60R 22/357* (2013.01); *B60W 50/02* (2013.01); *B60R 2022/4816* (2013.01); *B60R 2022/4866* (2013.01); *B60W 2050/0005* (2013.01)

(58) Field of Classification Search
CPC ...................................................... B60R 22/48
USPC ..................... 340/457.1, 460, 461, 686.4
See application file for complete search history.

(56) References Cited

U.S. PATENT DOCUMENTS

| | | | | |
|---|---|---|---|---|
| 5,621,326 | A * | 4/1997 | Watanabe | ........... B60R 21/0173 |
| | | | | 280/735 |
| 6,257,363 | B1 * | 7/2001 | Midorikawa | ........... B60R 22/44 |
| | | | | 180/268 |
| 6,485,057 | B1 * | 11/2002 | Midorikawa | ........... B60R 21/01 |
| | | | | 280/801.1 |
| 7,296,825 | B1 | 11/2007 | Zia et al. | |
| 2006/0208866 | A1 * | 9/2006 | Yanagi | .............. B60R 21/01546 |
| | | | | 340/457.1 |

(Continued)

FOREIGN PATENT DOCUMENTS

| | | |
|---|---|---|
| EP | 1702817 A1 | 9/2006 |
| EP | 3184378 A1 | 6/2017 |

OTHER PUBLICATIONS

Extended European Search Report dated Jun. 26, 2019 from the corresponding European Application No. 19174345, 8 pp.

*Primary Examiner* — Tai T Nguyen
(74) *Attorney, Agent, or Firm* — Brinks Gilson & Lione

(57) ABSTRACT

A vehicle system equipped with an apparatus for detecting a vehicle buckle may include: a buckle switch device which is turned on or off depending on whether a vehicle seat belt buckle is fastened; and a buckle detection apparatus that determines whether the vehicle seat belt buckle is fastened based on an on or off operation of the buckle switch device and diagnoses a failure of the buckle detection apparatus.

20 Claims, 11 Drawing Sheets

(56) References Cited

U.S. PATENT DOCUMENTS

| | | | |
|---|---|---|---|
| 2008/0093205 A1* | 4/2008 | Borst | B60R 22/48 |
| | | | 200/61.58 B |
| 2012/0259586 A1 | 10/2012 | Shields et al. | |
| 2014/0266239 A1* | 9/2014 | Dewey | B60R 22/48 |
| | | | 324/537 |

* cited by examiner

APPARATUS FOR DETECTING VEHICLE BUCKLE AND VEHICLE SYSTEM INCLUDING SAME

CROSS-REFERENCE TO RELATED APPLICATION

This application claims priority to and the benefit of Korean Patent Application No. 10-2018-0142006, filed on Nov. 16, 2018, the entire contents of which are incorporated herein by reference.

FIELD

The present disclosure relates to an apparatus for detecting a vehicle buckle, a system including the same and a method thereof, and more particularly, to a technology for diagnosing a state of a vehicle buckle.

BACKGROUND

The statements in this section merely provide background information related to the present disclosure and may not constitute prior art.

Generally, a vehicle is provided with an airbag device and a safety belt device as safety devices for securing a driver driving the vehicle and occupants. The airbag device and the safety belt device block between the structures of a vehicle and a human body such that some of the bodies of a driver and occupants sitting on seats are prevented from contacting or colliding with the structures in an accident, and prevent the human bodies from being separated from the seats. Particularly, the safety belt (seat belt) fixes the upper body to safely protect the driver and the occupants when collision occurs during driving, thereby preventing the driver and the occupants from being bumped against an instrument panel to minimize or reduce personal injury. Thus, in the related art, when a driver does not wear a seat belt, a warning of request to certainly wear the seat belt is output.

Conventionally, a buckle switch and a buckle sensor are provided to determine whether the seat belt is buckled. The buckle sensor (Hall IC type) may diagnose a failure and may accurately detect a buckle state. However, the cost is high and when the start-up is turned on, an airbag device uses buckle sensor information to determine whether the buckle is worn. Today, by law, the warning about the non-use of the seat belt buckle should be performed while the vehicle is turned on. Accordingly, a current vehicle system is dually provided with a buckle switch for detecting the non-use of the seat belt buckle while the vehicle is turned on, and a buckle sensor for diagnosing failures.

SUMMARY

The present disclosure has been made to solve the above-mentioned problems occurring in the prior art while advantages achieved by the prior art are maintained intact.

An aspect of the present disclosure provides an apparatus for detecting a vehicle buckle, which has only a buckle switch without being provided with both a buckle sensor and a buckle switch and is capable of accurately diagnosing whether a vehicle seat belt is buckled and accurately detecting whether the vehicle seat belt is out of order, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle system includes: a buckle switch device configured to turn on or off depending on whether a vehicle seat belt buckle is fastened, and a buckle detection apparatus that determines whether the vehicle seat belt buckle is fastened based on an on or off operation of the buckle switch device and diagnoses a failure of the buckle detection apparatus.

The buckle detection apparatus may include: a monitoring device that measures a current flowing toward the buckle switch device and a voltage, and a processor that determines whether the vehicle seat belt buckle is fastened by using the current and the voltage measured by the monitoring device and performs a failure diagnosis.

The vehicle system may further include a first resistor provided between the processor and the buckle switch device, and a capacitor provided between one terminal of the first resistor and a ground voltage terminal.

The buckle switch device may include second and third resistors connected in series between the ground voltage terminal and a power source voltage terminal, and a switching element provided in parallel with the third resistor connected to the ground voltage terminal.

The monitoring device may monitor a voltage applied to a second node between a first node and the second resistor.

The processor may compare a voltage level of the second node measured by the monitoring device with a preset voltage value or a current value of the second node measured by the monitoring device with a previously stored current value to determine whether the vehicle seat belt buckle is fastened.

The monitoring device may monitor a change in a current flowing through the first node which is an output terminal of the first resistor and the capacitor.

The processor may diagnose a failure by using a change in current which flows through the first node and is measured by the monitoring device.

The vehicle system may further include a warning device that may receive information about whether the vehicle seat belt buckle is fastened from the buckle detection apparatus and perform a warning.

The processor may perform an airbag deployment logic and record a failure diagnosis result in an event data recorder (EDR).

The vehicle system may further include a warning device that determines whether the vehicle seat belt buckle is fastened based on an on or off operation of the buckle switch device.

The warning device may determine that the vehicle seat belt buckle is unfastened when a switching element of the buckle switch device is connected to a terminal near the buckle detection apparatus.

The warning device may transmit information about a seat belt buckle fastening state to an integrated body unit (IBU) or a body controlling module (BCM) in a vehicle through CAN communication when the warning device determines that the vehicle seat belt buckle is unfastened.

The warning device may determine that the vehicle seat belt buckle is in a fastened state when the switching element of the buckle switch device is connected to a terminal near the warning device.

According to an aspect of the present disclosure, an apparatus for detecting a vehicle buckle includes: a monitoring device that measures a current flowing toward a buckle switch device and a voltage, and a processor that determines whether a vehicle seat belt buckle is fastened by using the current and the voltage measured by the monitoring device and performs a failure diagnosis.

The apparatus may further include a first resistor provided between the processor and the buckle switch device, and a capacitor provided between one terminal of the first resistor and a ground voltage terminal.

The monitoring device may monitor a voltage applied to a second node between a first node and the buckle switch device.

The processor may compare a voltage level of the second node measured by the monitoring device with a preset voltage value or a current value of the second node measured by the monitoring device with a previously stored current value to determine whether the vehicle seat belt buckle is fastened.

The monitoring device may monitor a change in a current flowing through the first node which is an output terminal of the first resistor and the capacitor.

The processor may diagnose a failure by using the change in the current which flows through the first node and is measured by the monitoring device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
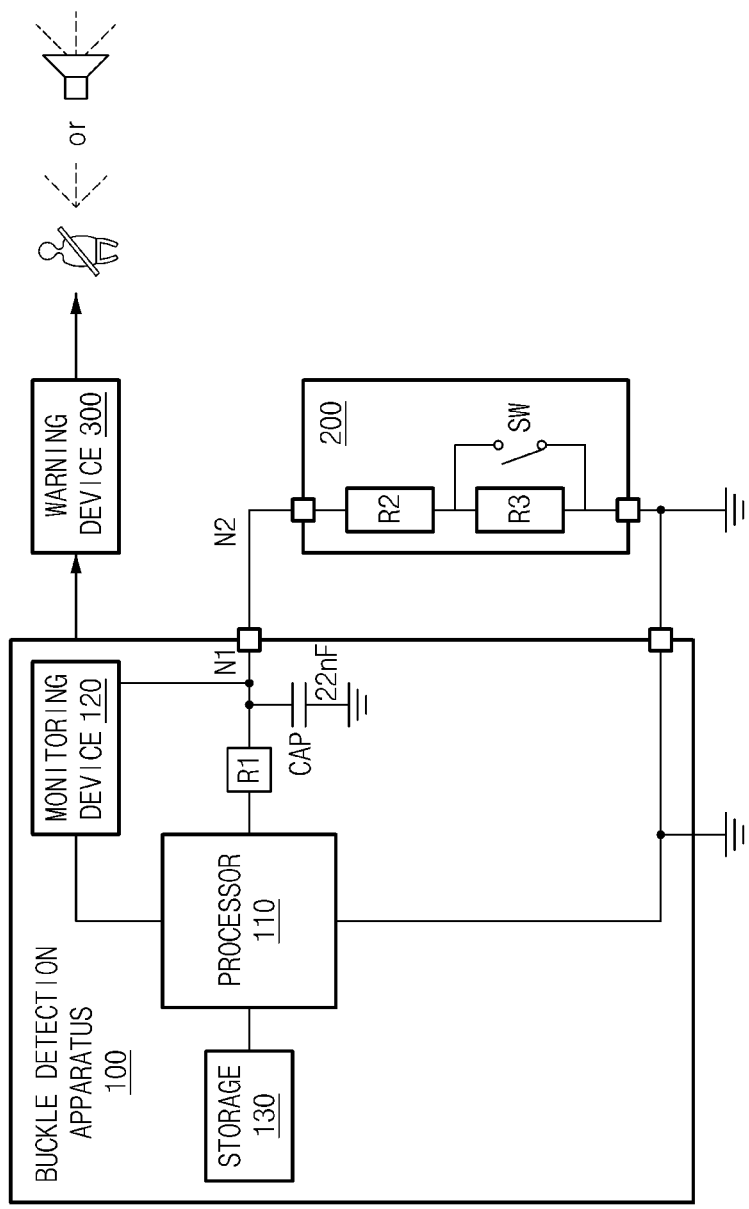
FIG. 1 is a block diagram showing a configuration of a vehicle system including a vehicle buckle detection apparatus.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known features or functions will be ruled out in order not to unnecessarily obscure the gist of the present disclosure.

In describing the components of the present disclosure, terms like first, second, "A", "B", (a), and (b) may be used. These terms are intended solely to distinguish one component from another, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

According to the present disclosure, there is provided a configuration which includes only a buckle switch without a separate buckle sensor and determines whether a vehicle seat belt is buckled and performs failure diagnosis through a buckle switch and a buckle detection apparatus.

Hereinafter, exemplary forms of the present disclosure will be described in detail with reference to FIGS. 1 to 11.

FIG. 1 is a block diagram showing a configuration of a vehicle system including a vehicle buckle detection apparatus according to one form of the present disclosure. The vehicle system of FIG. 1 may be mounted on a vehicle.

The vehicle system includes a buckle detection apparatus 100, a buckle switch device 200, and a warning device 300.

The buckle detection apparatus 100 may determine whether a vehicle seat belt is buckled according to an on/off operation of the buckle switch device 200 and may diagnose its own failure. The buckle detection apparatus 100 may be implemented with an airbag controlling unit (ACU), or the like.

To this end, the buckle detection apparatus 100 may include a processor 110, a monitoring device 120, storage 130, a resistor R1, and a capacitor CAP.

The processor 110 may be electrically connected to the monitoring device 120 and the storage 130, and may be an electric circuit for executing a software command, thereby performing various data processing and calculation described below.

The processor 110 may determine whether the seat belt is buckled, by using the current or voltage measured by the monitoring device 120, and may perform failure diagnosis.

That is, the processor 110 may diagnose a failure by using a change in the current flowing through a first node N1 detected by the monitoring device 120. In addition, the processor 110 may compare the voltage level of a second node N2 detected by the monitoring device 120 with a previously stored voltage value to determine whether the vehicle seat belt is buckled.

When the failure is diagnosed, the processor 110 may perform an airbag deployment logic and record the failure diagnosis result in an event data recorder (EDR).

The monitoring device 120 may monitor the voltage applied to the second node N2 between the first node N1 and the buckle switch device 200 and may transmit the result to the processor 110. The monitoring device 120 may monitor the change in the current flowing through the first node N1 which is an output terminal of the resistor R1 and the capacitor CAP and may transmit the result to the processor 110.

The storage 130 may store the current value of the first node for failure diagnosis in advance and store the voltage value of the second node for determining whether the buckle is fastened in advance. In this case, the previously stored current and voltage values may be calculated by experimental values. In addition, the storage 130 may store the failure diagnosis result, and the failure diagnosis result may be stored in a separate event data recorder (EDR).

The storage 130 may include a storage medium having at least one type of a flash memory type, a hard disk type, a micro type, a card type of a memory (for example, an SD, XD memory, or the like), RAM (Random Access Memory), SRAM (Static RAM), ROM (Read-Only Memory), EEPROM (Electrically Erasable Programmable Read-Only Memory), PROM (Programmable Read-Only Memory), MRAM (Magnetic RAM), a magnetic disc, and an optical disc.

The buckle switch device 200 may be turned on and off depending on whether the vehicle seat belt is fastened. The buckle switch device 200 includes resistors R2 and R3 and a switching element SW.

The resistors R2 and R3 are connected in series between a ground voltage terminal and an output terminal (a power supply voltage terminal) of the buckle detection apparatus 100, and the switching element SW is connected in parallel with the resistor R3.

As the switch element SW is turned on or off, the voltages applied to the resistors R2 and R3 and the voltage value applied to the second node N2 between the resistor R2 and the output terminal of the buckle detection apparatus 100 may be changed. Thus, the buckle detection apparatus 100 may determine whether the vehicle seat belt buckle is fastened based on the change in the voltage value of the second node N2.

The warning device 300 may receive information about whether the vehicle seat belt buckle is fastened from the buckle detection apparatus 100, and may output a warning when the user does not fasten the vehicle seat belt buckle. In this case, the warning may output a warning light or a warning sound. The warning device 300 may be implemented with an integrated body unit (IBU), a body controlling module (BCM), or the like.

Figure 2:
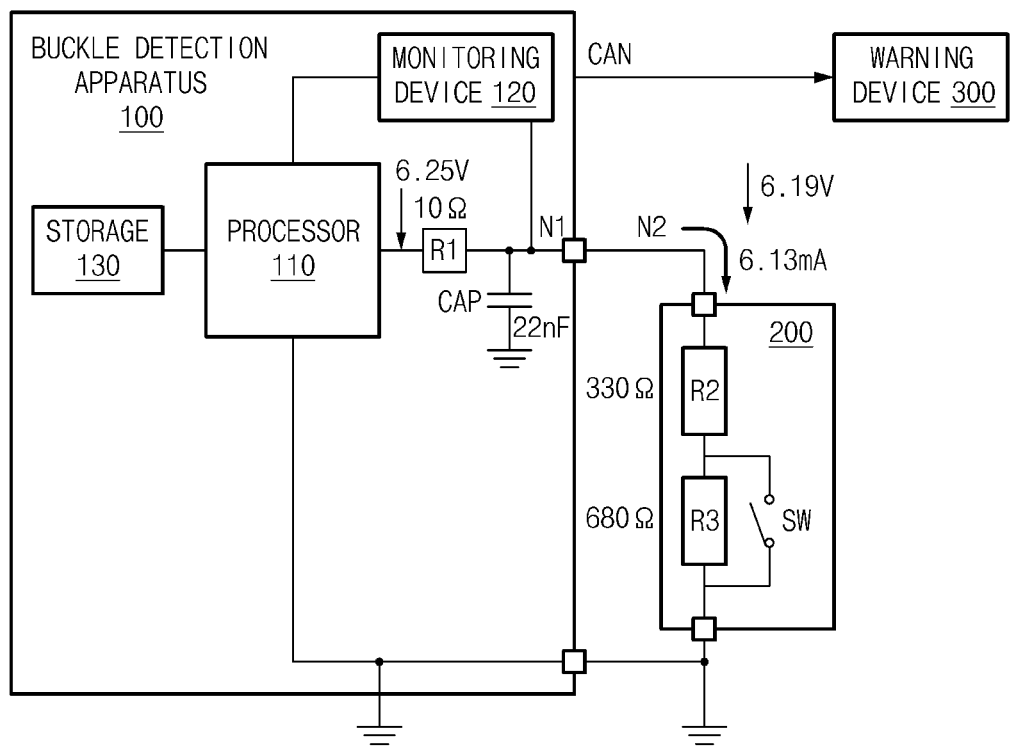
FIG. 2 is a view illustrating an operation in a normal state of a vehicle buckle detection apparatus when a buckle is fastened.
Figure 3:
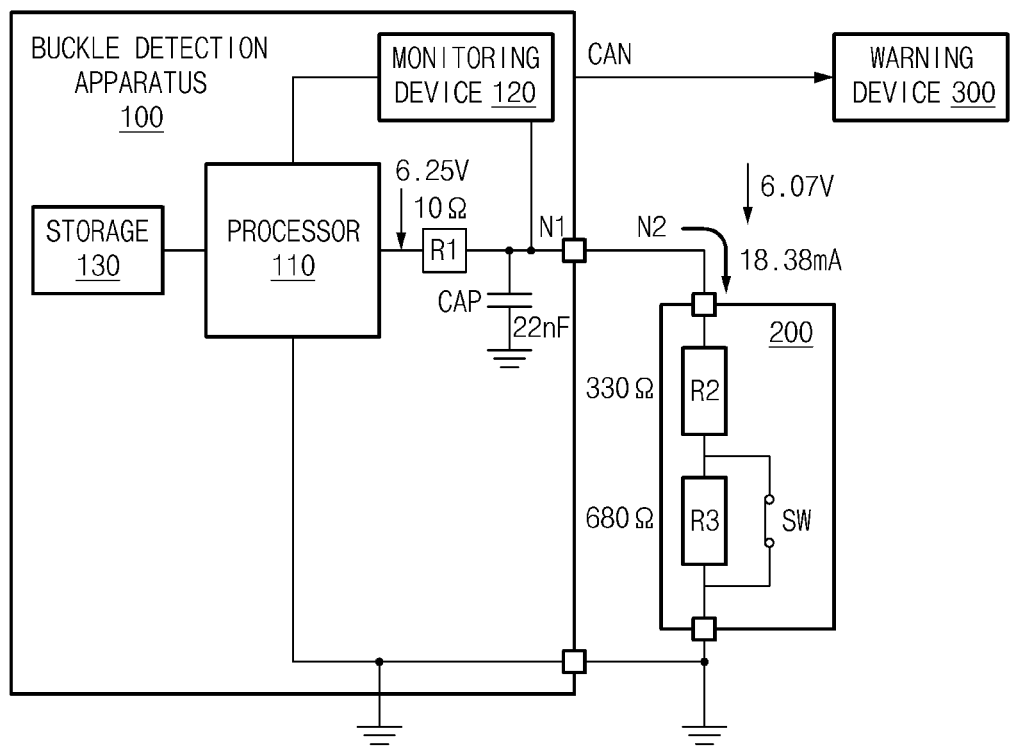
FIG. 3 is a view illustrating an operation in a normal state of a vehicle buckle detection apparatus when a buckle is unfastened.

FIG. 2 is a view illustrating an operation in a normal state of a vehicle buckle detection apparatus according to one form of the present disclosure when a buckle is fastened. FIG. 3 is a view illustrating an operation in a normal state of a vehicle buckle detection apparatus according to another form of the present disclosure when a buckle is unfastened.

Referring to FIG. 2, when the switching element SW is opened (a state where the seat belt buckle is fastened), it may be understood that the voltage applied to the second node N2 is 6.19 V and the current flowing through the second node N2 is 6.13 mA.

Meanwhile, referring to FIG. 3, when the switching element SW is closed (a state where the seat belt buckle is unfastened), it may be understood that the voltage applied to the second node N2 is 6.07 V and the current flowing through the second node N2 is 18.38 mA.

As described above, since the voltage value or the current value applied to the second node N2 is changed depending on whether the switching element SW is opened or closed, the buckle detection apparatus 100 may determine whether the seat belt buckle is fastened or not by storing the voltage and current values applied to the second node N2 as the switch element SW is opened or closed in advance in the storage 130 and comparing the voltage and current values of the second node N2 measured when the switching element SW is opened or closed with the previously stored voltage and current values. FIGS. 2 and 3 show the changes in the voltage and current values depending on whether the switching element SW is opened or closed in a normal state.

Figure 4:
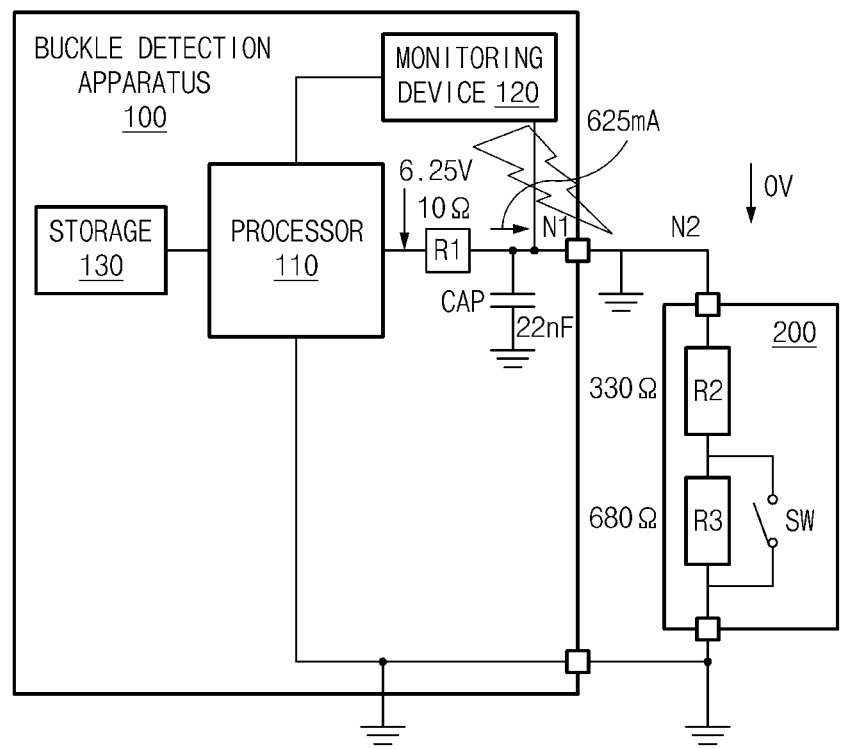
FIG. 4 is a view illustrating an operation of a vehicle buckle detection apparatus in an abnormal state due to a short to ground when the buckle is fastened.
Figure 5:
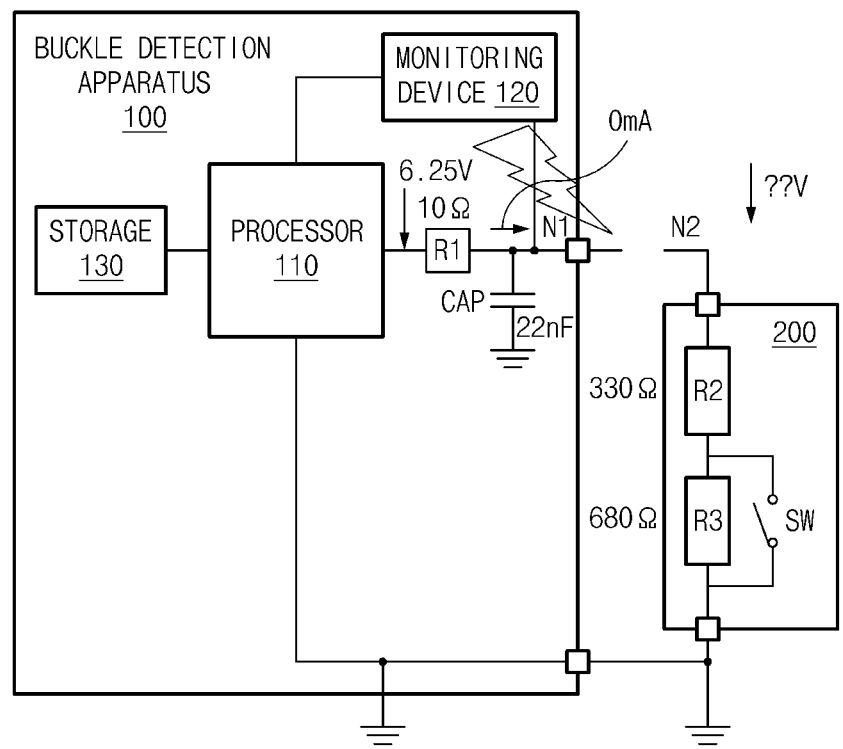
FIG. 5 is a view illustrating an operation of a vehicle buckle detection apparatus in an abnormal state due to an open circuit when the buckle is fastened.

FIGS. 4 and 5 are views illustrating the failure diagnosis of the buckle detection apparatus when the buckle is fastened, that is, when the switching device SW is opened.

Figure 6:
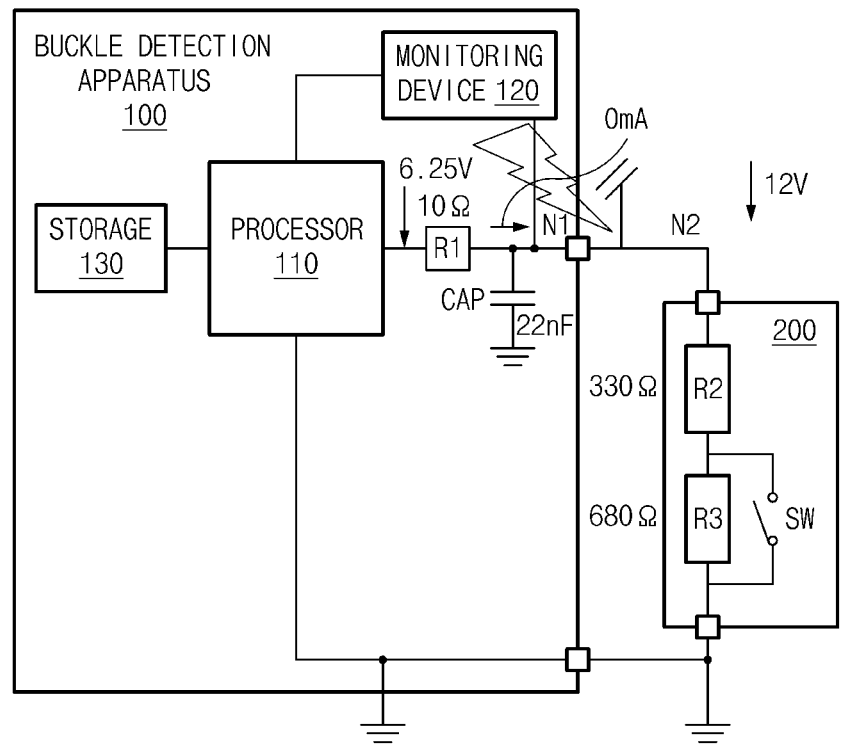
FIG. 6 is a view illustrating an operation of a vehicle buckle detection apparatus in an abnormal state due to a short to battery when the buckle is fastened.

FIG. 4 is a view illustrating an operation of a vehicle buckle detection apparatus according to one form of the present disclosure in an abnormal state due to a short to ground when the buckle is fastened. FIG. 5 is a view illustrating an operation of a vehicle buckle detection apparatus according to another form of the present disclosure in an abnormal state due to an open circuit when the buckle is fastened. FIG. 6 is a view illustrating an operation of a vehicle buckle detection apparatus according to one form of the present disclosure in an abnormal state due to a short to battery when the buckle is fastened.

Referring to FIG. 4, in a state that the switching element SW is opened, the voltage of the second node N2 is 0 V and the current flowing through the first node N1 is 625 mA. Thus, the buckle detection apparatus 100 may determine the failure caused due to a short-to-ground by using the voltage value of the second node N2 and the current value of the first node N1.

Referring to FIG. 5, in a state in which the switching element SW is opened, the voltage of the second node N2 is not known and the current flowing through the first node N1 is 0 mA. Thus, the buckle detection apparatus 100 may determine the failure caused due to an open circuit by using the voltage state of the second node N2 and the current value of the first node N1.

Referring to FIG. 6, in the state that the switching element SW is opened, the voltage of the second node N2 is 12 V and the current flowing through the first node N1 is 0 mA. Thus, the buckle detection apparatus 100 may determine the failure caused due to a short-to-battery by using the voltage state of the second node N2 and the current value of the first node N1. In this case, when a failure occurs due to a short-to-ground, a short-to-battery, an open circuit, or the like when the switching element SW is opened, the change in the voltage of the second node N2 and the change in the current of the first node N1 may be stored in advance with experimental values and the buckle detection apparatus 100 may diagnose the failure by comparing the measured voltage value of the second node N2 and the measured current value of the first node N1 with the previously stored values.

Figure 7:
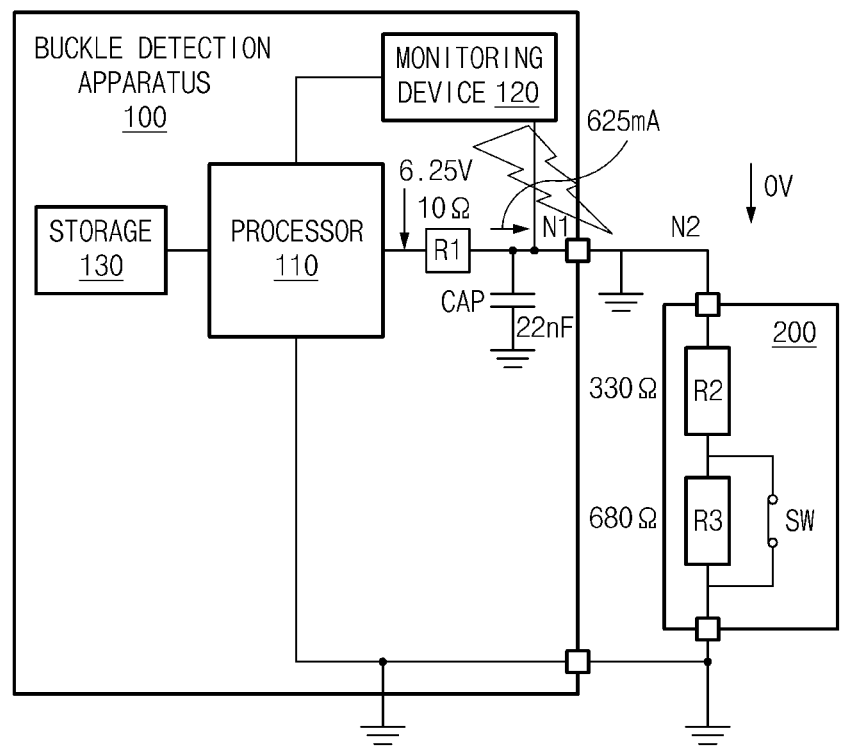
FIG. 7 is a view illustrating an operation of a vehicle buckle detection apparatus in an abnormal state due to a short-to-ground when the buckle is unfastened.
Figure 8:
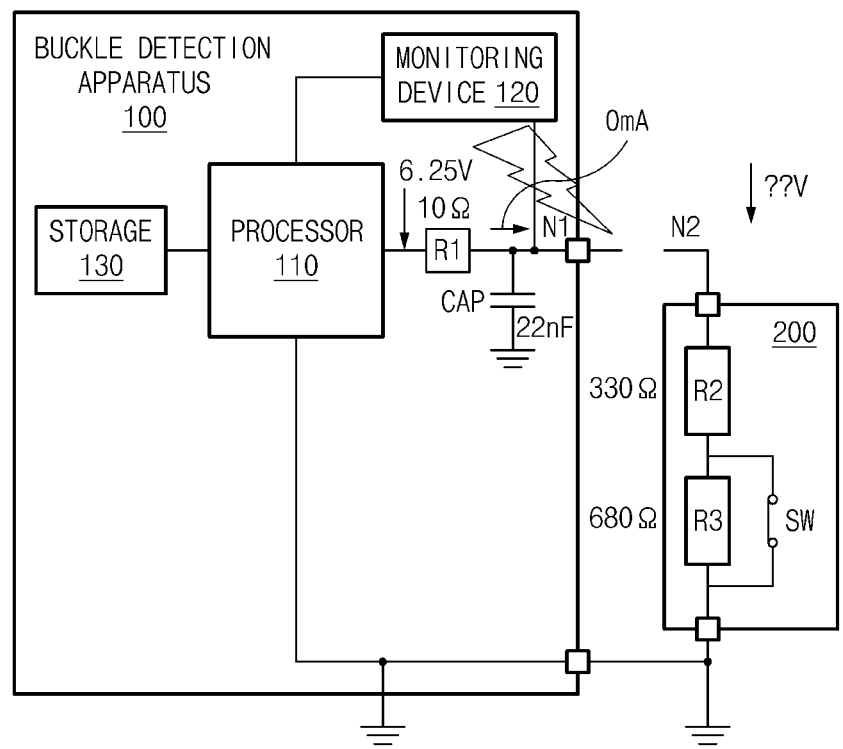
FIG. 8 is a view illustrating an operation of a vehicle buckle detection apparatus in an abnormal state due to an open circuit when the buckle is unfastened.
Figure 9:
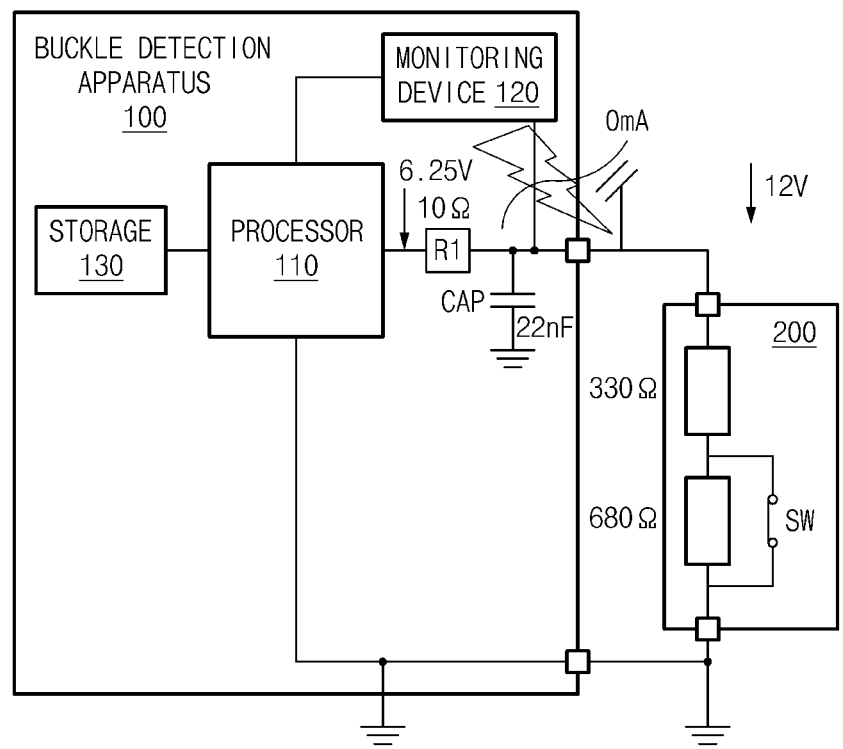
FIG. 9 is a view illustrating an operation of a vehicle buckle detection apparatus in an abnormal state due to a short-to-battery when the buckle is unfastened.

FIGS. 7 to 9 are views illustrating the failure diagnosis of the buckle detection apparatus when the buckle is unfastened, that is, when the switching device SW is closed.

FIG. 7 is a view illustrating an operation of a vehicle buckle detection apparatus according to one form of the present disclosure in an abnormal state due to a short-to-ground when the buckle is unfastened. FIG. 8 is a view illustrating an operation of a vehicle buckle detection apparatus according to another form of the present disclosure in an abnormal state due to an open circuit when the buckle is unfastened. FIG. 9 is a view illustrating an operation of a vehicle buckle detection apparatus according to another exemplary form of the present disclosure in an abnormal state due to a short-to-battery when the buckle is unfastened.

Referring to FIG. 7, in a state that the switching element SW is closed, the voltage of the second node N2 is 0 V and the current flowing to the first node N1 is 625 mA. Accordingly, the buckle detection apparatus 100 may determine the failure caused due to a short-to-ground by using the voltage value of the second node N2 and the current value of the first node N1.

Referring to FIG. 8, in a state in which the switching element SW is closed, the voltage of the second node N2 is not known and the current flowing through the first node N1 is 0 mA. Thus, the buckle detection apparatus 100 may determine the failure caused due to a short circuit by using the voltage state of the second node N2 and the current value of the first node N1.

Referring to FIG. 9, in the state that the switching element SW is closed, the voltage of the second node N2 is 12 V and the current flowing through the first node N1 is 0 mA. Thus, the buckle detection apparatus 100 may determine the failure caused due to a short-to-battery by using the voltage state of the second node N2 and the current value of the first node N1. In this case, when a failure occurs due to a short-to-ground, a short-to-battery, a disconnection, or the like when the switching element SW is closed, the change in the voltage of the second node N2 and the change in the current of the first node N1 may be stored in advance with experimental values and the buckle detection apparatus 100 may diagnose the failure by comparing the measured voltage value of the second node N2 and the measured current value of the first node N1 with the previously stored values.

Following Table 1 illustrates the operation of the present disclosure in comparison with a conventional case in the case of failure diagnosis.

TABLE 1

| Failure | Related art | Present disclosure | Example of operation |
| --- | --- | --- | --- |
| Short to battery | Belt fastening | Short to battery | <Fact: when seat belt is not worn><br>Related art: deployment logic (pretensioner operation), collision recording (fastening)<br>Change: deployment logic (pretensioner operation), collision recording (failure) |
| Short to ground | Belt unfastening | Short to ground | <Fact: when seat belt is worn><br>Related art: deployment logic (pretensioner non-operation), collision recording (unfastening)<br>Greatest problem change: deployment logic (pretensioner operation), collision recording (failure) |
| Open circuit | Belt fastening | Open circuit | <Fact: when seat belt is not worn><br>Related art: deployment logic (pretensioner operation), collision recording (fastening)<br>Change: deployment logic (pretensioner |

TABLE 1-continued

| Failure | Related art | Present disclosure | Example of operation |
| --- | --- | --- | --- |
| | | | operation), collision recording (failure) |

Referring to Table 1, according to the related art, even if a failure such as a short-to-battery, a short-to-ground, or an open circuit occurs, it is merely determined whether the seat belt buckle is fastened or unfastened and it is recorded in the event data recorder as a normal state. However, according to the present disclosure, the result of the failure diagnosis may be immediately recorded in an event data recorder, and the pretensioner may be operated when the deployment logic of the buckle detection apparatus (an airbag deployment device) is performed.

That is, when the voltage of the output terminal of the buckle switch is equal to or higher than a specified voltage, the vehicle system according to the related art determines that the seat belt is in a buckle fastened state. When the voltage of the output terminal of the buckle switch is lower than the specified voltage, the vehicle system according to the related art determines that the seat belt is in a buckle unfastened state. However, we have discovered that the vehicle system according to the related art cannot recognize a case where the determination result is different from the actual seat belt buckle fastening state, so that the deployment logic of the air bag control apparatus may be deployed differently from the actual seat belt buckle fastening state and erroneous information may be recorded in the event data recorder.

However, the buckle detection apparatus 100 according to the exemplary forms of the present disclosure may accurately detect whether the seat belt buckle is fastened and correctly diagnose a failure, thereby accurately driving the deployment logic of an air bag control device and improving the reliability of the data recorded in the event data recorder.

In addition, the forms of the present disclosure may include only the buckle switch (the switching element SW) without having any buckle sensors so that the cost is reduced, and the buckle detection apparatus 100 may be driven by using the battery power, so that the information about whether the seat belt buckle is fastened may be provided to the warning device before the start-up is turned on, thereby perform a warning while the start-up is turned on.

Figure 10:
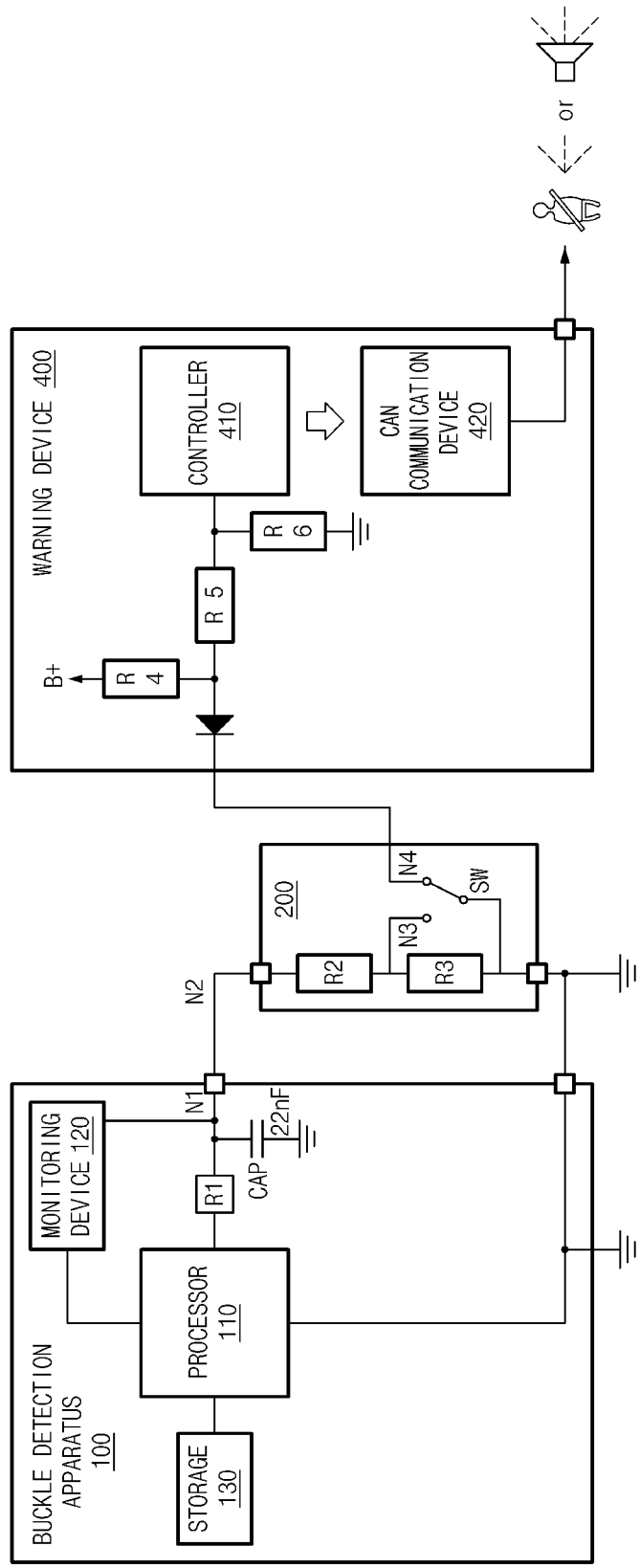
FIG. 10 is a block diagram illustrating a configuration of a vehicle system including a vehicle buckle detection apparatus.

FIG. 10 is a block diagram illustrating a configuration of a vehicle system including a vehicle buckle detection apparatus according to another form of the present disclosure. The vehicle system of FIG. 10 may be mounted on a vehicle.

Referring to FIG. 10, a vehicle system includes the buckle detection apparatus 100, the buckle switch device 200, and a warning device 400.

Since the detailed configurations, operations and functions of the buckle detection apparatus 100 and the buckle switch device 200 are the same as those of FIG. 1, the details will be omitted.

The switching element SW of the buckle switch device 200 may be only turned on or off depending on whether or not the vehicle seat belt buckle is fastened. In the on state, the switching element SW is connected to a node N3 near the buckle detection apparatus 100 (i.e., the node N3 electronically connected to the buckle detection apparatus 100), and in the off state, the switching element SW is connected to a node N4 near the warning device 400 (i.e., the node N4 electronically connected to the warning device 400). Although an example of the switching element SW connected to the node N4 near the warning device 400 is shown in FIG. 10, the switching element SW may be connected to either the node N3 or the node N4 depending on whether or not the seat belt is fastened.

The operations of the monitoring device 120 and the processor 110 according to the on/off operation of the switching element SW of the buckle switch device 200 are the same as that in FIG. 1.

That is, the monitoring device 120 monitors the voltage applied to the second node N2 between the first node N1 and the buckle switch device 200, which changes in accordance with the on/off operation of the switching element SW of the buckle switch device 200, and transmits the monitored voltage to the processor 110.

The processor 110 may determine whether the seat belt is buckled by using the current or voltage measured by the monitoring device 120 and perform a failure diagnosis.

The warning device 400 may include resisters R4, R5 and R6, a controller 410, and a CAN communication device 420. The warning device 400 may be implemented with an integrated central control unit (ICU) of a vehicle.

When the switching element SW of the buckle switch device 200 is connected to the node N4, the controller 410 may determine that the switching element SW is opened so that the seat belt buckle is in a fastened state. The controller 410 may perform an in-vehicle warning through the CAN communication device 420.

The CAN communication device 420 transmits seat belt buckle fastening state information to an integrated body unit (IBU), a body controlling module (BCM), and the like, and the IBU or the BCM performs functions of seat belt remind (SBR) and the like, thereby turning on a warning light or outputting a warning sound.

Figure 11:
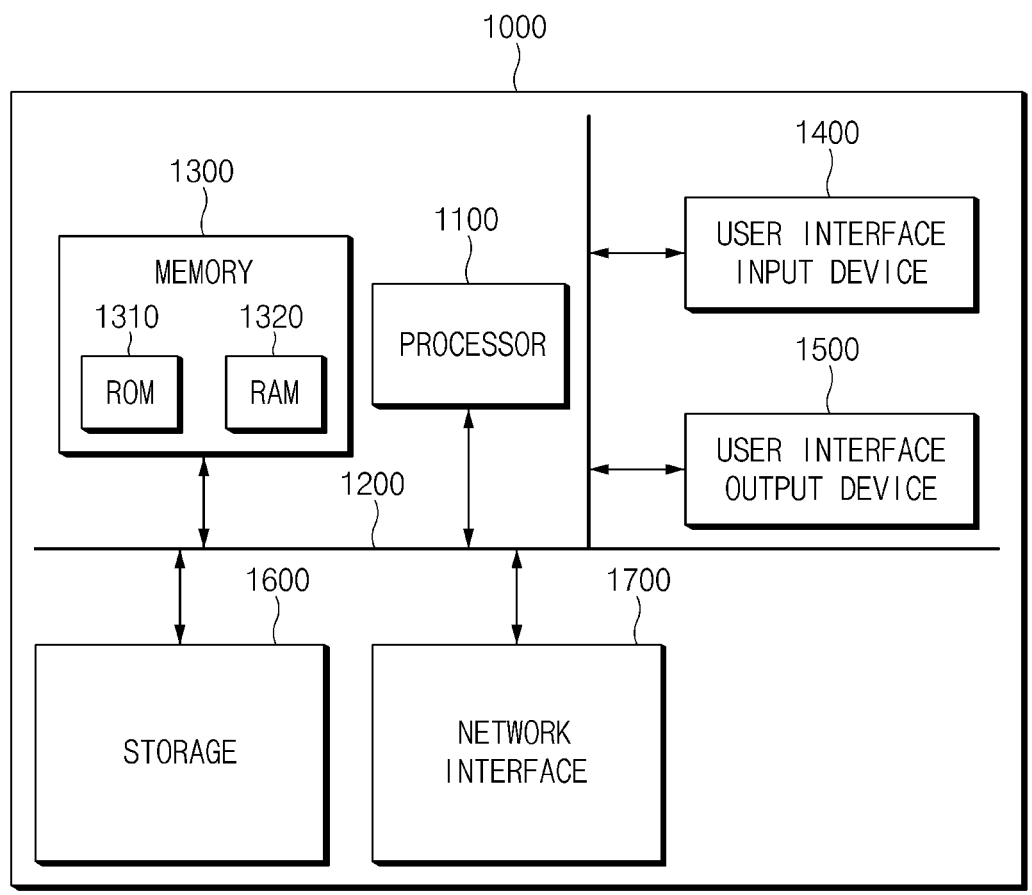
FIG. 11 is a block diagram illustrating a computer system.

FIG. 11 is a block diagram illustrating a computer system according to one form of the present disclosure.

Referring to FIG. 11, a computing system 1000 may include at least one processor 1100, a memory 1300, a user interface input device 1400, a user interface output device 1500, storage 1600, and a network interface 1700, which are connected to each other through a bus 1200.

The processor 1100 may be a central processing unit (CPU) or a semiconductor device which performs processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with the forms disclosed herein may be embodied directly in hardware, in a software module executed by the processor 1100, or in a combination of the two. The software module may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc.

An exemplary storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

According to the present technology, both the conventional buckle sensor and buckle switch are not provided, but only the buckle switch is provided, and it is possible to accurately detect whether the seat belt is buckled and accurately diagnose whether the apparatus is out of order.

In addition, various effects that are directly or indirectly understood through the present disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A vehicle system comprising:
   a buckle switch device configured to turn on or off depending on whether a vehicle seat belt buckle is fastened; and
   a buckle detection apparatus configured to:
     determine whether the vehicle seat belt buckle is fastened based on a level of voltage applied to the buckle switch device, the level of voltage corresponding to an on or off operation of the buckle switch device, and
     diagnose a failure of the buckle detection apparatus based on a change in a current measured at an output terminal of the buckle detection apparatus.

2. The vehicle system of claim 1, wherein the buckle detection apparatus includes:
   a monitoring device configured to measure a current flowing toward the buckle switch device and the voltage applied to the buckle switch device; and
   a processor configured to determine whether the vehicle seat belt buckle is fastened based on the change in the current and the voltage level measured by the monitoring device and to perform the failure diagnosis.

3. The vehicle system of claim 2, further comprising:
   a first resistor provided between the processor and the buckle switch device and configured to drop the voltage applied to the buckle detection apparatus; and
   a capacitor provided between a terminal of the first resistor and a ground voltage terminal and configured to charge or discharge the voltage applied to the buckle detection apparatus.

4. The vehicle system of claim 3, wherein the buckle switch device includes:
   second and third resistors connected in series between the ground voltage terminal and a power source voltage terminal and configured to drop the voltage applied to the buckle detection apparatus; and
   a switching element provided in parallel with the third resistor connected to the ground voltage terminal and configured to turn on or turn off based on whether the vehicle seat belt buckle is fastened.

5. The vehicle system of claim 4, wherein the monitoring device is configured to monitor a voltage applied to a second node between a first node and the second resistor.

6. The vehicle system of claim 5, wherein the processor is configured to compare a voltage level of the second node measured by the monitoring device with a preset voltage value or a current value of the second node measured by the monitoring device with a previously stored current value and configured to determine whether the vehicle seat belt buckle is fastened.

7. The vehicle system of claim 4, wherein the monitoring device is configured to monitor a change in a current flowing through a first node which is an output terminal of the first resistor and the capacitor.

8. The vehicle system of claim 7, wherein the processor is configured to diagnose a failure by using a change in current which flows through the first node and is measured by the monitoring device.

9. The vehicle system of claim 2, wherein the processor is configured to perform an airbag deployment logic and record a failure diagnosis result in an event data recorder (EDR).

10. The vehicle system of claim 1, further comprising:
a warning device configured to receive information about whether the vehicle seat belt buckle is fastened from the buckle detection apparatus and perform a warning.

11. The vehicle system of claim 1, further comprising:
a warning device configured to determine whether the vehicle seat belt buckle is fastened based on the on or off operation of the buckle switch device.

12. The vehicle system of claim 11, wherein the warning device is configured to determine that the vehicle seat belt buckle is unfastened when a switching element of the buckle switch device is connected to a terminal near the buckle detection apparatus.

13. The vehicle system of claim 12, wherein the warning device is configured to transmit information about a seat belt buckle fastening state to an integrated body unit (IBU) or a body controlling module (BCM) in a vehicle through CAN communication when the warning device determines that the vehicle seat belt buckle is unfastened.

14. The vehicle system of claim 11, wherein the warning device is configured to determine that the vehicle seat belt buckle is in a fastened state when a switching element of the buckle switch device is connected to a terminal near the warning device.

15. An apparatus for detecting a vehicle buckle, the apparatus comprising:
a monitoring device configured to measure a current flowing toward a buckle switch device and a voltage of the buckle switch device; and
a processor configured to perform a failure diagnosis using a change in the current measured by the monitoring device and determine whether a vehicle seat belt buckle is fastened by using the voltage measured by the monitoring device.

16. The apparatus of claim 15, further comprising:
a first resistor provided between the processor and the buckle switch device and configured to drop the voltage applied to the buckle detection apparatus; and
a capacitor provided between a terminal of the first resistor and a ground voltage terminal and configured to charge or discharge the voltage applied to the buckle detection apparatus.

17. The apparatus of claim 16, wherein the monitoring device is configured to monitor a voltage applied to a second node between a first node and the buckle switch device.

18. The apparatus of claim 17, wherein the processor is configured to compare a voltage level of the second node measured by the monitoring device with a preset voltage value or a current value of the second node measured by the monitoring device with a previously stored current value and configured to determine whether the vehicle seat belt buckle is fastened.

19. The apparatus of claim 16, wherein the monitoring device is configured to monitor a change in a current flowing through a first node which is an output terminal of the first resistor and the capacitor.

20. The apparatus of claim 19, wherein the processor is configured to diagnose a failure by using the change in the current which flows through the first node and is measured by the monitoring device.

* * * * *